Oct. 8, 1935.  F. J. RALPH  2,017,016

COIN FREED AMUSEMENT APPARATUS

Filed Dec. 6, 1934   7 Sheets-Sheet 1

INVENTOR
Frank J. Ralph.
BY
William C. Linton.
ATTORNEY

Oct. 8, 1935.  F. J. RALPH  2,017,016
COIN FREED AMUSEMENT APPARATUS
Filed Dec. 6, 1934  7 Sheets-Sheet 3

INVENTOR
Frank J. Ralph.
BY
William C. Linton.
ATTORNEY

Oct. 8, 1935.  F. J. RALPH  2,017,016
COIN FREED AMUSEMENT APPARATUS
Filed Dec. 6, 1934   7 Sheets-Sheet 5

INVENTOR
Frank J. Ralph.
BY
William C. Sinton
ATTORNEY

Oct. 8, 1935.　　　　　F. J. RALPH　　　　　2,017,016
COIN FREED AMUSEMENT APPARATUS
Filed Dec. 6, 1934　　　7 Sheets-Sheet 6

INVENTOR
Frank J. Ralph.
BY
William C. Linton.
ATTORNEY

Oct. 8, 1935.    F. J. RALPH    2,017,016
COIN FREED AMUSEMENT APPARATUS
Filed Dec. 6, 1934    7 Sheets-Sheet 7

INVENTOR
Frank J. Ralph.
BY
William C. Sintow.
ATTORNEY

Patented Oct. 8, 1935

2,017,016

UNITED STATES PATENT OFFICE 2,017,016

COIN-FREED AMUSEMENT APPARATUS

Frank James Ralph, Thorpe Bay, England

Application December 6, 1934, Serial No. 756,315
In Great Britain December 12, 1933

3 Claims. (Cl. 273—119)

This invention relates to coin-freed amusement or game apparatus wherein balls or other similar objects are projected by a universally mounted striker or cue along a surface, such as a board, against one or more deflectors and thence into one or more apertures constituting a target and wherein, according to the skill of the player, some balls are returned for re-play and others become "dead" for the further duration of that player's session or innings; the apparatus also being of the kind embodying pivotal and/or slidable means for moving the balls or other objects into play, In apparatus of the known kind, the universally mounted striker or cue is spring-controlled, that is to say, it is withdrawn by the player against the tension of one or more springs and then released so that it is urged by spring-pressure against the ball at which it is aimed and which it strikes with a force dependent upon the degree of compression or tension as the case may be of the spring or springs, the player having no control over the striker on its forward stroke.

This invention has for its principal object to increase the element of personal skill while at the same time reducing the element of chance in such apparatus, another object being to provide an improved and interesting type of game applicable to the above-mentioned kind of amusement apparatus which does not involve the return to the players of any money or tokens.

According to the invention, a coin-freed amusement or game apparatus embodies, in combination, a cabinet containing a visible playing surface terminating in a series of target apertures, a series of balls or like objects for playing over said surface, a resilient deflector located intermediately of said playing surface, a coin-controlled pivotal trough holding said series of balls before being brought into play, means to elevate said series of balls to the level of said playing surface, a hand-operated device to deliver one ball at a time on to said playing surface, a hand-propelled multi-directionally mounted striker or cue accommodated in a horizontal slot in said cabinet, an inclined tray communicating with some of said target apertures to return a ball to said elevating means for re-play, and a second inclined tray communicating with others of said target apertures to divert a ball into said pivotal trough wherein it remains out of play.

In addition, the invention may include an arrangement for illuminating the playing surface, the functioning of which is controlled by the position of the balls or similar objects.

In one convenient constructional embodiment of the invention the apparatus comprises an enclosed casing or cabinet, the front of which is provided at a convenient height with a glazed panel through which the playing surface can be viewed and below which there is mounted, in a horizontal slot, the freely slidable hand-propelled striking device for projecting the balls over said surface, a coin slot also being being formed in the front of the cabinet and leading to a coin chute in rear thereof.

This coin chute opens above one member of a linkage mounted pivotally interiorly of the front of the cabinet and connected to a pivotal latch adapted to be unlocked, by the weight of a coin, from engagement with a pivotal trough adapted to be moved by a rotary knob or handle projecting through the front of the cabinet and whereof the spindle is provided with a pin and cam, one of which actuates said pivotal trough and the other of which actuates a coin release latch to remove the coin from the chute into a coin retaining receptacle.

The aforesaid pivotal trough is designed for the reception of the selected number of balls or other objects and is moved angularly, after the insertion of the coin, in order to transfer the balls through a non-return trap into a well, formed vertically within the cabinet, up which well the balls are thereafter elevated in known manner by a slidable member having an operating knob projecting through a vertical slot in the adjacent side wall of the cabinet, in order to pass the balls through a second non-return trap into an inclined passage leading to the playing surface, said inclined passage being closed at its lower end by a slidable gate whereof the forward end projects through a slot in the front of the cabinet and which is constructed so that only one ball at a time may be extracted or released from said inclined passage on to the playing surface.

If the apparatus is provided with means whereby to illuminate the playing surface, an electric lamp may be located suitably within the cabinet and its leads may be in circuit with a switch mounted on the aforesaid pivotal trough in such a manner that when the full complement of balls is in the trough the switch is caused to break the lamp circuit.

The playing surface comprises a horizontal tray located rearwardly of the slot in which the striking device is mounted in the front of the cabinet, said tray being of any desired configuration and being bounded at each side and at the back by a wall partly in which and partly in the corresponding edges of the tray are formed a number of target apertures, one series of one shape for those balls which on passing through them become "dead", and another series of another shape for those balls which on passing through them are returned for re-play.

Approximately in the centre of the playing surface is disposed an india-rubber lozenge-shaped cushion or deflector between which and the front side of the playing surface there are also two adjustable, or fixed, pins or similar obstacles spaced symmetrically with said cushion or deflector; the area between said pins and the front panel of the cabinet being the "baulk" from which each ball is played in turn.

A short distance below the tray constituting the playing surface is located a second walled tray which is inclined downwardly towards the front of the cabinet and whereof the surface is designed to receive the balls which pass through that series of target apertures through which the balls become "dead", a channel leading from said tray to a point adjacent the aforesaid pivotal trough into which each ball is delivered by gravity from said channel to become "dead". This second or "dead ball" tray is apertured in order to give access to a third tray located below it and on to which the balls fall after passage through any one of the target apertures from which a ball is to be returned for re-play; said third or "return tray" being also downwardly inclined towards the front of the cabinet and also being formed with a channel whence a ball falling on the tray is delivered by gravity to and through a non-return trap formed in the aforesaid vertical well from which the balls are brought into position for individual introduction on to the playing surface.

The hand-propelled striking device consists of a short stem, in the nature of a cue, mounted so as to be slidable axially freely in both directions within a tubular sleeve which in turn is arranged slidably in guides along the aforesaid transverse slot in the front of the cabinet in which slot said sleeve is also sufficiently loosely mounted to permit universal movement of the cue to a limited degree; the extent of axial movement of the cue being limited by a pin passing transversely through it and riding in two diametrically opposite longitudinal slots in said sleeve.

Preferably the cue passes through a circular aperture in a sliding panel arranged to mask the transverse slot in the front wall of the cabinet and serving to prevent a player from sighting the balls through said transverse slot.

The abovementioned embodiment of the invention is illustrated by way of example in the accompanying drawings, in which.

Figure 1:
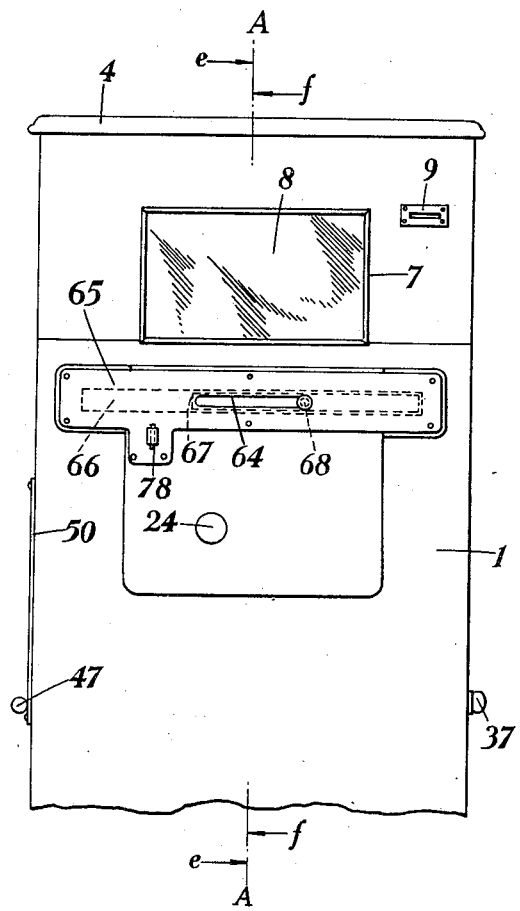
Figure 1 is a front elevation and Figure 2 is a side view of the cabinet enclosing the various elements of the apparatus.
Figure 2:
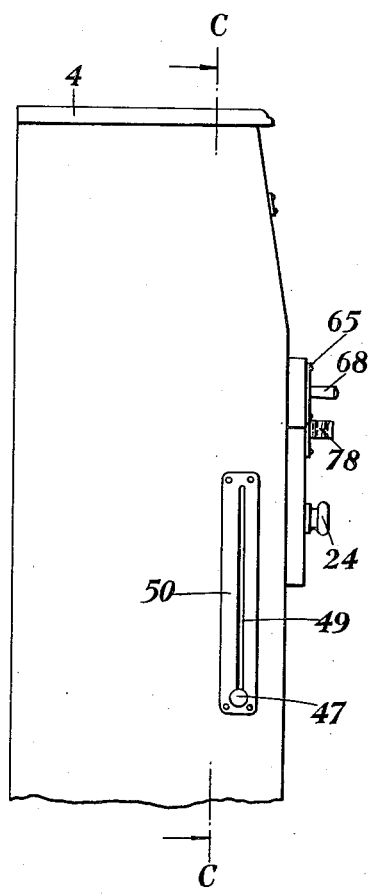

The cabinet in which the game apparatus is assembled includes a front 1, sides 2 and 3, a top 4, a back 5, and false bottom or horizontal partition 6 in the base of the cabinet which may terminate in any manner appropriate to the location of the cabinet.

The front 1 slopes slightly rearwardly towards the top and is formed with a rectangular aperture 7 in which is set a glazed panel 8.

Near the top of the right hand side of the front 1 is a coin slot 9 communicating with a vertical coin chute 10 attached to the rear face of the front 1, said chute being slotted laterally at 11 at its lower extremity to enable a coin to escape therefrom.

Below said lower extremity of the coin chute 10 is mounted a T-shaped arm 12 pivoted at 13 to the front 1 and whereof the lower end of its vertical limb is articulated at 14 to a link 15 which is in turn articulated at 16 to the foot of a latch member 17 pivoted at 18 to the front 1.

The nose of the latch member 17 engages a notch 19 formed in a forward extension 20 of a trough 21 (see Figure 11) which is mounted on a pivot screw 22 taking into the front 1; a spring 23 anchored to the front 1 bearing on the underside of the trough 21.

Beneath said extension 20 on the trough 21 and projecting forwardly through an aperture in the front 1 is an angularly movable operating knob or handle 24 upon the inwardly extending spindle 25 of which is keyed or otherwise suitably mounted a boss 26 carrying a cam 27 which bears on the underside of the extension 20, and a lug 28 to which is articulated at 29 one end of a link 30 whereof the opposite end is articulated at 31 to the foot of a coin-supporting arm 32 of which the upper end is pivoted at 33 to the front 1; a spring 34 secured at 35 to the front 1 being confined between the side 2 and said arm 32. 36 is a coin receptacle in the form of a drawer to which a handle 37 is attached.

Figure 11:
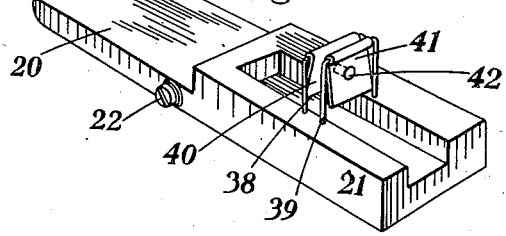
Figure 11 is a detail view of the pivotal trough from which the balls or other objects are moved into play.

As will be seen most clearly in Figure 11, the pivotal trough 21 is open at the rear end and, intermediately of its length, is provided with an electric switch comprising two inverted U-shaped standards 38, 39, parallel with one another and bridging the trough, from which standards depend respectively two loosely mounted leaves 40, 41, through the centre of the latter of which passes an adjustable contact screw 42; the two standards 38, 39, being electrically connected to terminals 43, 44, respectively, fixed to the underside of the trough 21 (see Figure 3) and to which are connected the leads for an electric lamp circuit (not shown) whereby the interior of the cabinet may be illuminated.

The open end of the pivotal trough 21 faces a vertical well 45 formed alongside the side wall 2 of the cabinet, and in this well is arranged a slidable block 46 operated by an external knob 47 on a stem 48 projecting through a vertical slot 49 in said side wall 2 (see Figures 2, 7, 8 and 9). A slotted guide plate 50 is screwed onto the side 2 over said slot 49.

In said well 45 are formed two apertures 51 (see Figures 3, 6 and 7) and 52 (see Figures 3, 4 and 9), each masked interiorly by a non-return pivoted shutter (not shown); the aperture 51 being located in the side wall of the well 45 which faces the open end of the trough 21, and the aperture 52 being located in the rear wall of the well 45 and at a lower level than the aperture 51.

53 (see Figures 3, 4, 5, 6 and 7) is the playing surface the rear edge of which is supported by a cross member 53A and the front edge of which is supported by a bar 53B secured to the front 1. In the example illustrated, said surface 53 is substantially T-shaped in plan view, the narrow forwardly projecting portion 54 constituting the "baulk" area from which the balls or like objects are played. The perimeter of this playing surface is bounded at the sides and back by side walls 55, 56, and a rear wall 57 which support a cover plate 58 having an aperture of the same contour as the plan of the playing surface.

The playing surface 53 is formed along its rear edge and partly also at its side edges with a series of target apertures 59 of rectangular shape and a second series of target apertures 60 of rounded shape; and roughly in the centre of the surface 53 a lozenge-shaped india-rubber or other resilient deflector or cushion 61 is fixed between which cushion and the baulk area 54 are stationed two pegs 62, 62, having cross-bars 63, 63, which may be adjustable, to serve as obstacles in the path of a ball between the baulk area and the cushion.

In the front 1 of the cabinet and slightly above the level of the playing surface 53, a horizontal slot 64 is formed and externally of this slot is fitted a slotted guide plate 65 in rear of which is a rectangular recess 66 in which slides a thin wooden or other strip 67 formed centrally with a circular aperture through which passes a striking device or cue 68 consisting of a metal rod or stem, the outer end of which serves as a handpiece, and the forward or striking end of which is tapered as shown.

Figure 10:
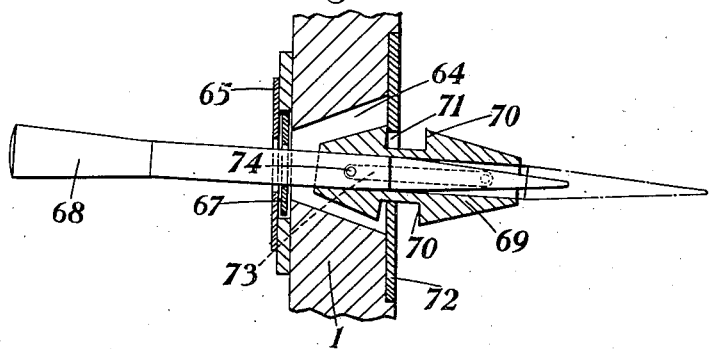
Figure 10 is a detail view of the mounting for the striking device or cue.

As will be seen from Figure 10, the slot 64 is flared towards the interior of the cabinet and the cue 68 passes axially through a sleeve 69 which is formed externally with two oppositely disposed transverse grooves 70, 70, by which the sleeve is mounted loosely in a slot 71 in a plate 72 fastened to the rear of the front 1 of the cabinet, the length of the slot 71 coinciding with that of the slot 64. Externally the sleeve 69 is oppositely tapered and it is also furnished with two diametrically opposite longitudinal slots 73 in which ride trunnions or a cross pin 74 borne by the cue 68, the length of said slots 73 limiting the extent to which the cue 68 can be moved axially of the sleeve 69.

The side wall 55 of the playing surface 53 is formed adjacent the baulk area with an aperture 74 which communicates with a shutter-controlled slot 51A in the top of the side wall of the well 46 by means of a downwardly inclined and channelled chute 75, the walls of which are slotted transversely at 76 adjacent to the side wall 55 and in said slots 76 is slidably mounted a gate 77 projecting forwardly through a slot in the front 1 of the cabinet and terminating externally thereof in a handle 78; the inner extremity of said slidable gate being anchored by a spring 79 to the wall 55. Integral with the inner end of said slidable gate 77 and projecting rearwardly therefrom is a curved finger 80 which may conveniently be formed by stamping out an arched slot 81 from the lower inner end of the gate 77 (see Figure 6) said slot 81 being slightly wider than the channel in chute 75.

Figure 8:
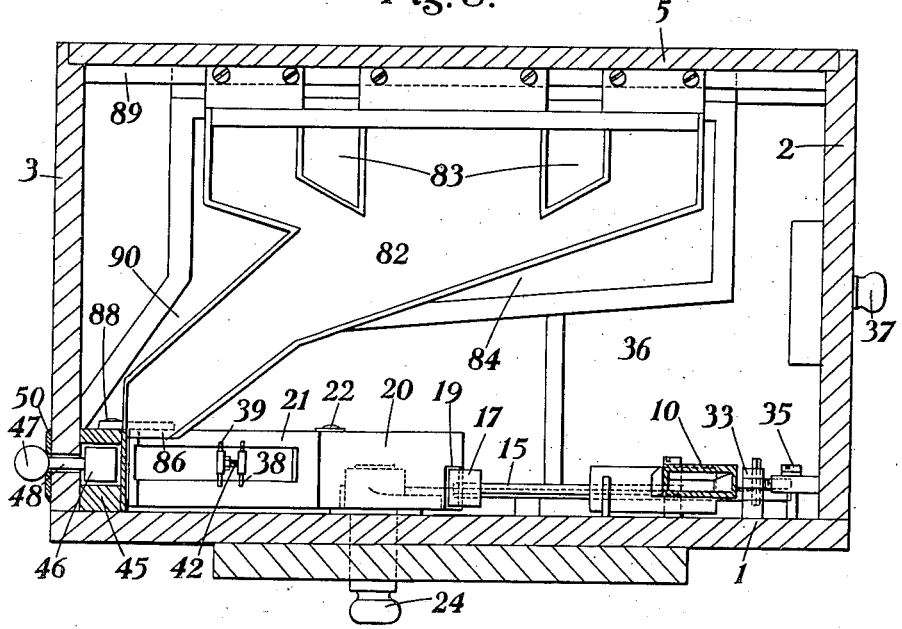
Figure 8 is a similar view on line h, h, Figure 4, and Figure 9 a similar view on line k, k, Figure 4.

The rectangular target apertures 59 in the playing surface 53 are in communication with a flanged tray 82 mounted a short distance below said playing surface and inclined downwardly towards the front of the cabinet. The configuration of this tray 82 is shown in Figure 8 from which it will be seen that the tray somewhat resembles a deformed letter $y$, and is slotted or apertured at its upper part at 83, 83, which slots or apertures 83 are situated below the rounded target apertures 60 from which passage is therefore accessible to a second flanged tray 84 mounted below the tray 82 and similarly downwardly inclined towards the front of the cabinet. Forwardly, the tray 82 develops into an inclined channel 85, the mouth 86 of which terminates alongside the well 45 and just above the end of the pivotal trough 21 adjacent thereto (see Figure 8). The rear edge of the tray 82 is supported by a cross member 87 (Figures 4, 5 and 6) extending transversely of the cabinet and the channel 85 rests on a bracket 88 fixed to the rear wall of the well 45 (see Figures 3, 4, 6 and 8).

Figure 9:
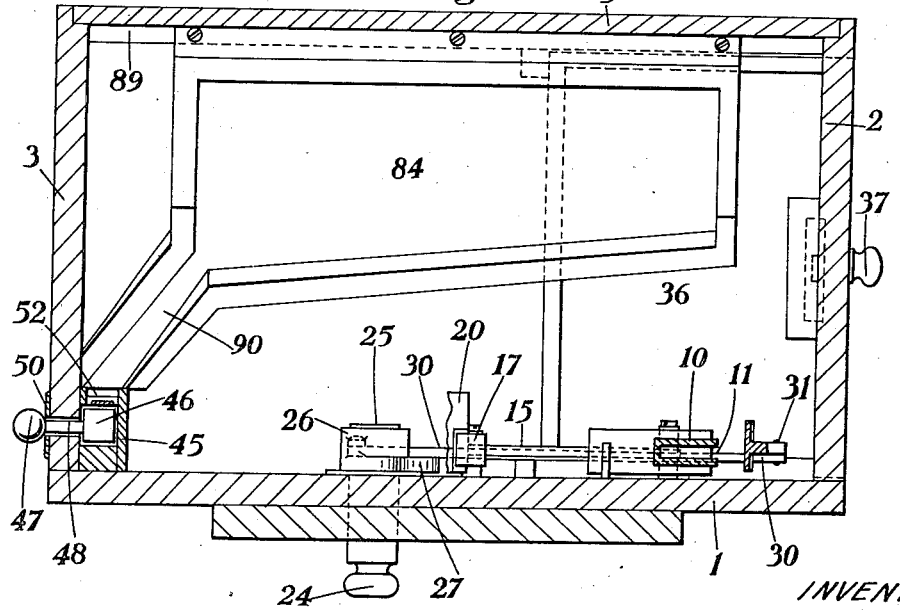

At its widest part the tray 82 does not mask the rounded apertures 60, 60, in the side walls 55 and 56 of the playing surface 53 and these apertures together with the similarly shaped apertures 60 in the rear edge of the playing surface have access to said second flanged tray 84 whereof the configuration is illustrated in Figure 9.

Figure 3:
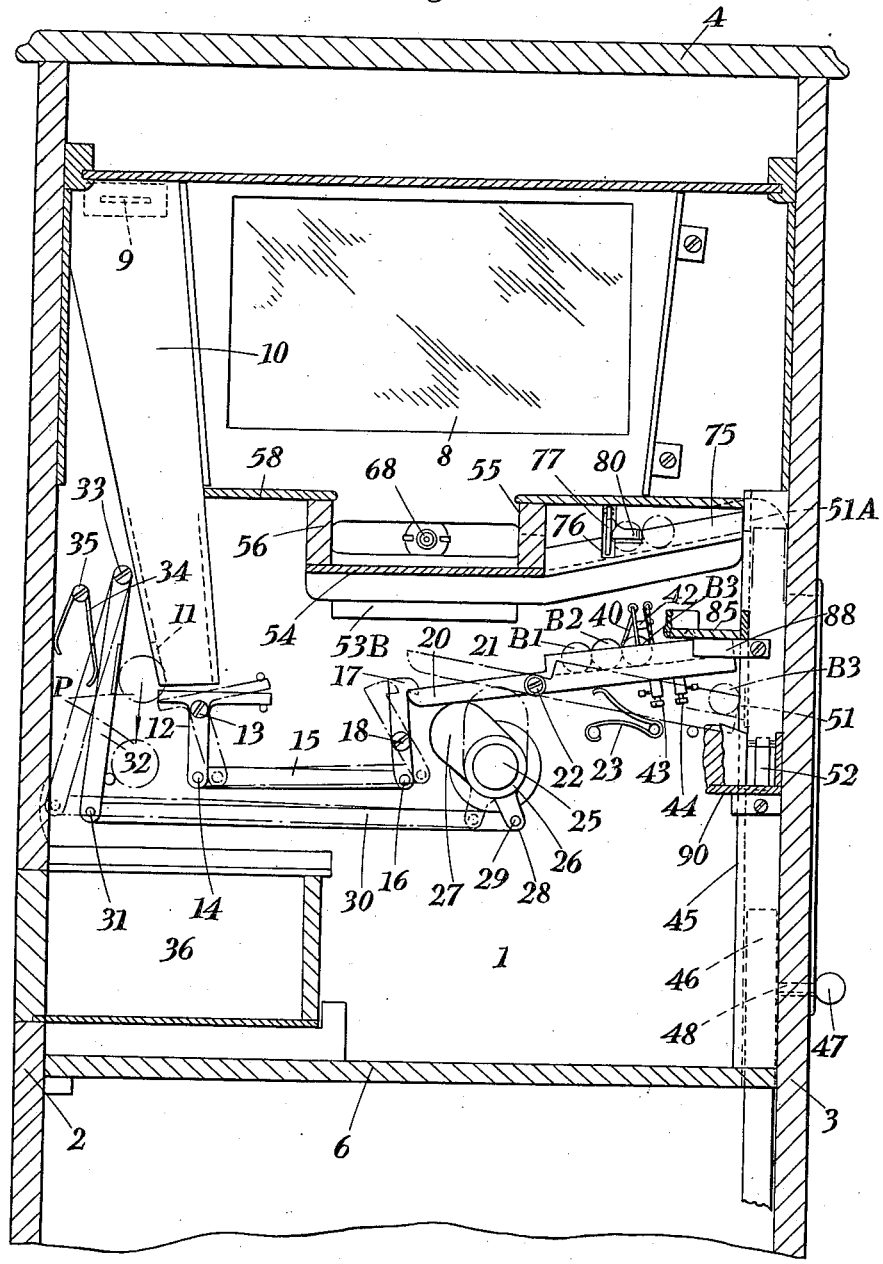
Figure 3 is a vertival section on line C, C, in Figure 2.
Figure 4:
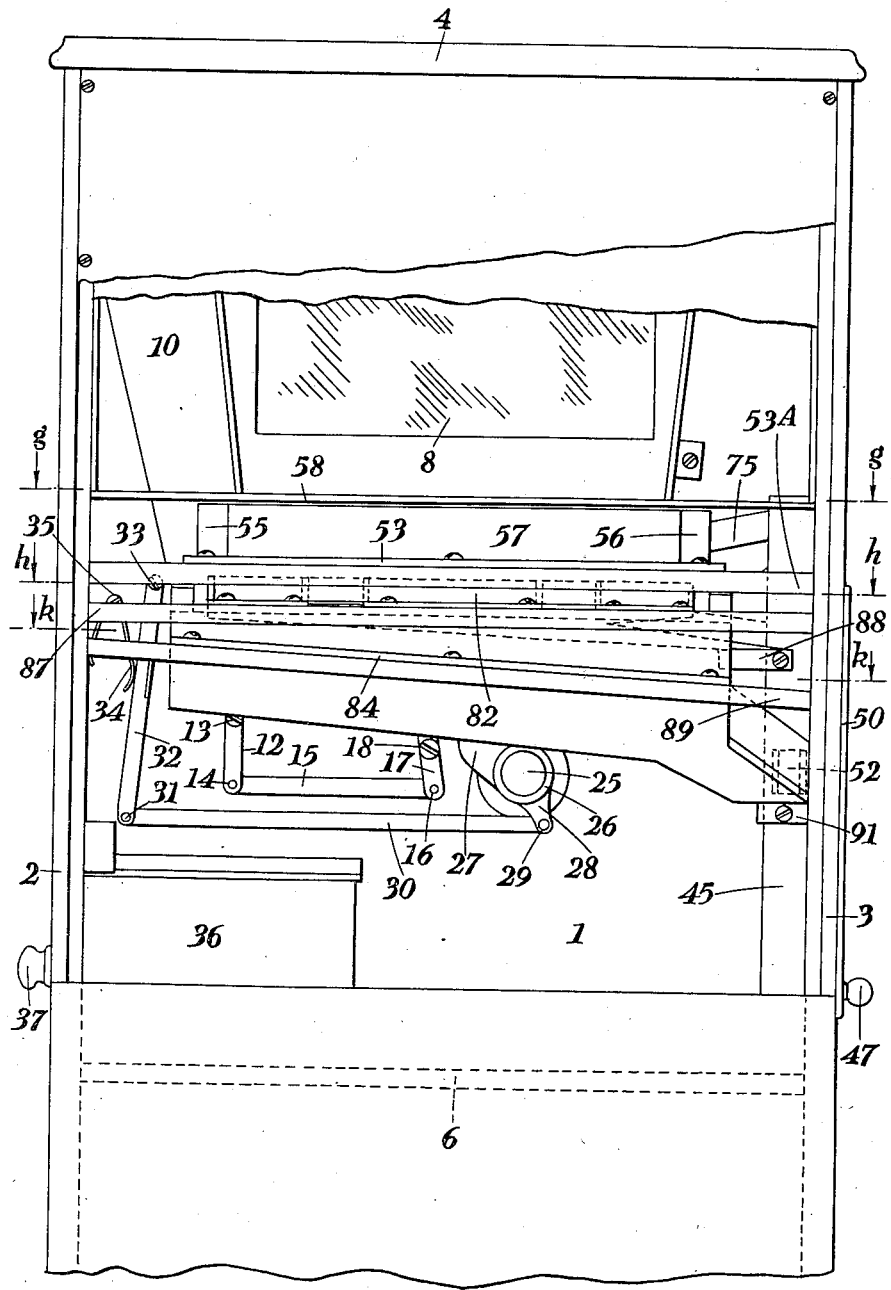
Figure 4 is a rear elevation with the back of the cabinet removed.
Figure 5:
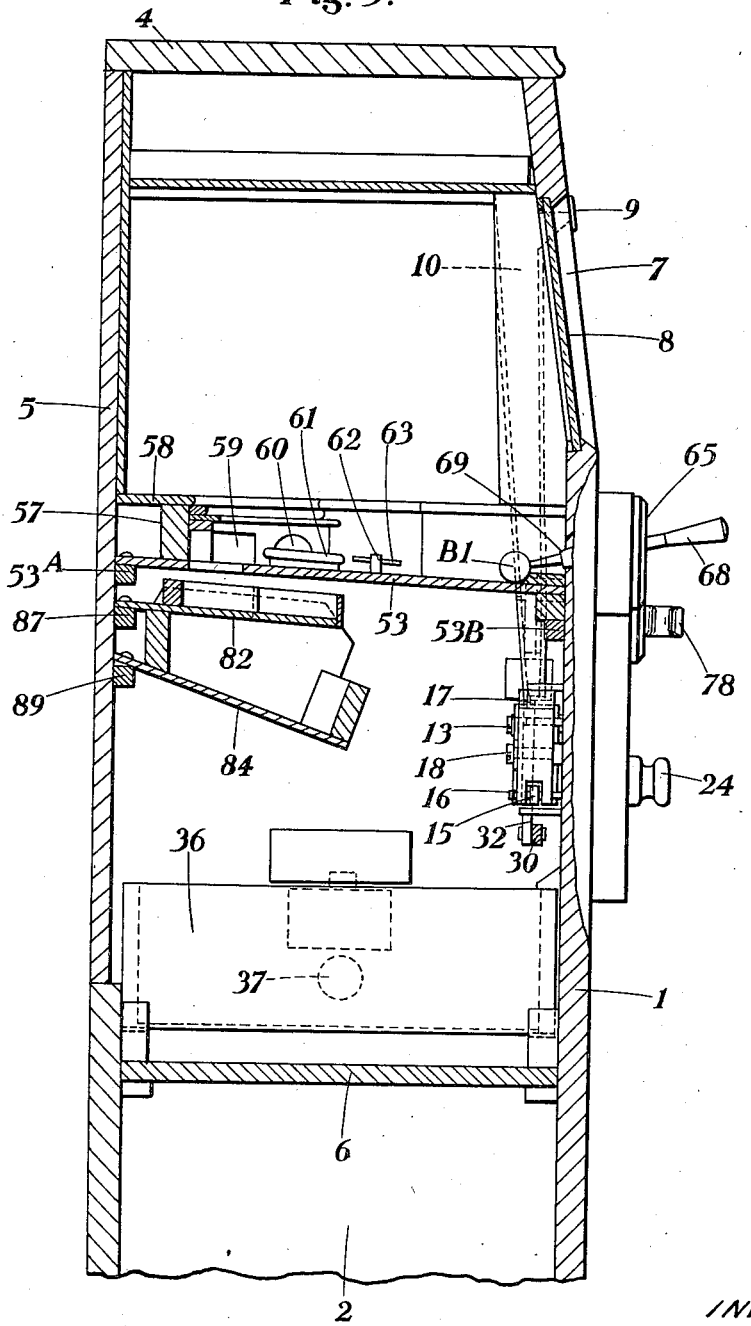
Figures 5 and 6 are vertical sections on line A, A, of Figure 1, looking in the direction of the arrows e, e, and f, f, respectively.
Figure 6:
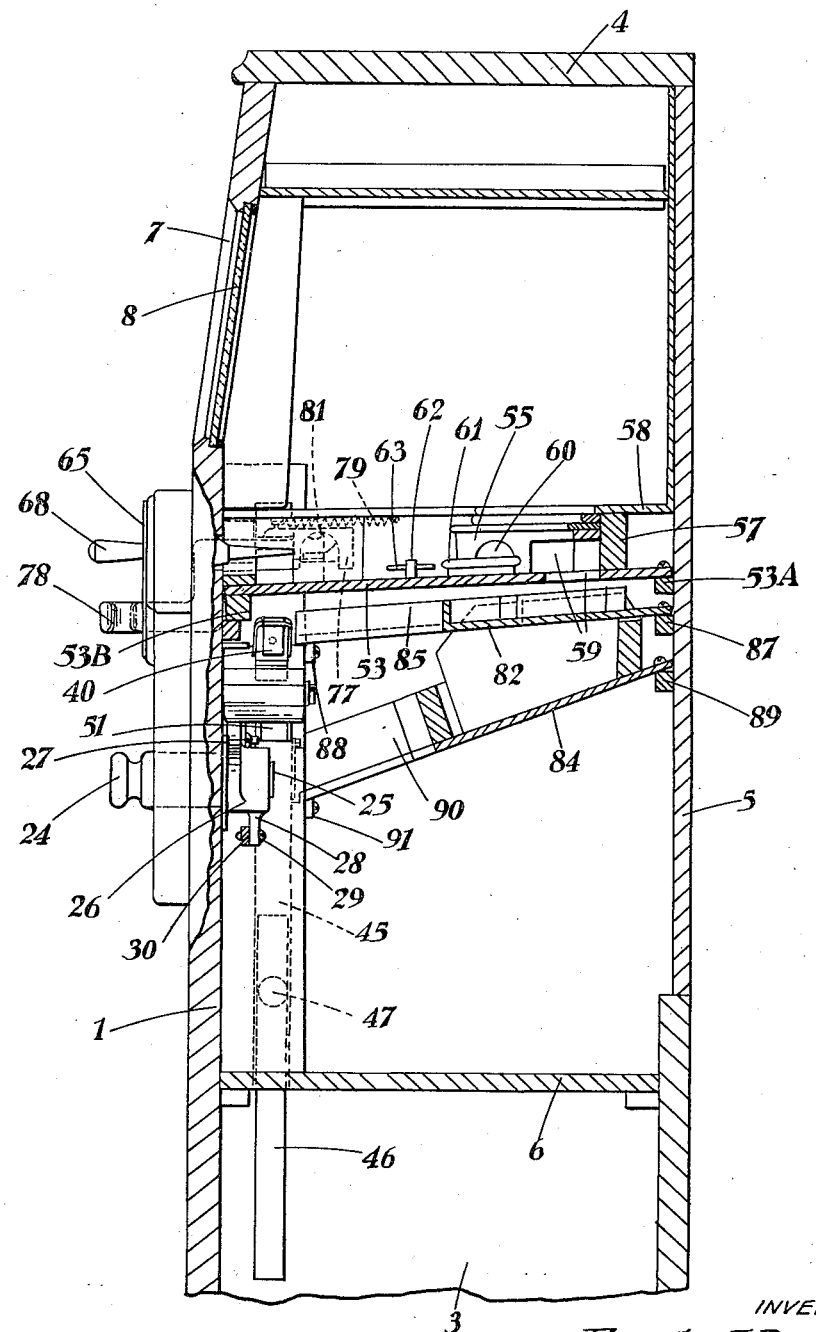

This tray 84, whereof the rear edge is secured to a cross member 89 (see Figures 4, 5, 6 and 8) extending transversely of the cabinet, is inclined downwardly and forwardly and develops into a passage 90 the open end of which is located facing the aforesaid shutter-controlled aperture 52 in the rear wall of the well 45; the bottom of the passage 90 being supported by a bracket or lug 91 screwed to the wall of the well 45 (see Figures 3, 4 and 6).

In the particular example of the invention illustrated by the accompanying drawings, the full complement of playing objects is three balls or marbles indicated respectively by the references B1, B2, B3, which, as will be seen in Figure 3, are normally accommodated in the pivotal trough 21 wherein the last ball B3 of the series is so positioned as to hold the leaf 40 of the switch controlling the lighting of the cabinet out of contact with the screw 42 so that while all the balls occupy the trough 21 the current does not flow through the lamp (not shown) which may be located conveniently within the head of the cabinet and may be adapted to be plugged in to an appropriate lighting "point".

The inoperative positions of the coin-controlled elements are shown in full lines in Figure 3 wherein it will be seen that the extension 20 of the trough 21 is engaged by the nose of the latch member 17 and the trough cannot be manipulated to disturb the position of the balls.

When it is desired to operate the game, a coin, say a penny, is inserted through the coin-slot 9 and falls down the coin-chute 10 on to the left-hand extremity of the horizontal arm of the lever 12 which thereupon tilts and passes the coin P partly through the lateral slot 11 in the foot of the chute 10 in which position the edge of the coin rests against the spring-controlled pivoted arm 32; the weight of the coin being sufficient to move the lever 12, link 15 and latch member 17 into the positions indicated by dot-and-dash lines in Figure 3, thus releasing the nose of the latch member 17 from engagement with the notch 19 in the extension 20 of trough 21.

The knob or handle 24 projecting through the front 1 of the cabinet is then rotated anti-clockwise to cause the arm or cam 27 to move angularly upwards and raise the extension 20 of trough 21 also upwards, at the same time, through lug 28 and link 30, moving the pivoted arm 32 against the tension of spring 34 angularly outwards and releasing the coin P which thereupon falls into the receptacle 36.

This upward movement of the extension 20 tilts the trough 21 downwardly and brings its open end into register with the shutter-controlled aperture 51 in the side wall of the well 45 and causes the balls B1, B2, B3, to roll out of the trough 21 and fall on to the slidable block 46 at the bottom of the well 45, at the same time bringing the leaf 40 of the switch into contact with the screw 42 and establishing the lighting circuit for illuminating the playing surface 53.

When the balls are heard to have fallen onto the sliding block 46 the handle 24 is released and the springs 23 and 34 return their associated parts to their initial positions and the latch member 17 re-engages with the extension 20.

Figure 7:
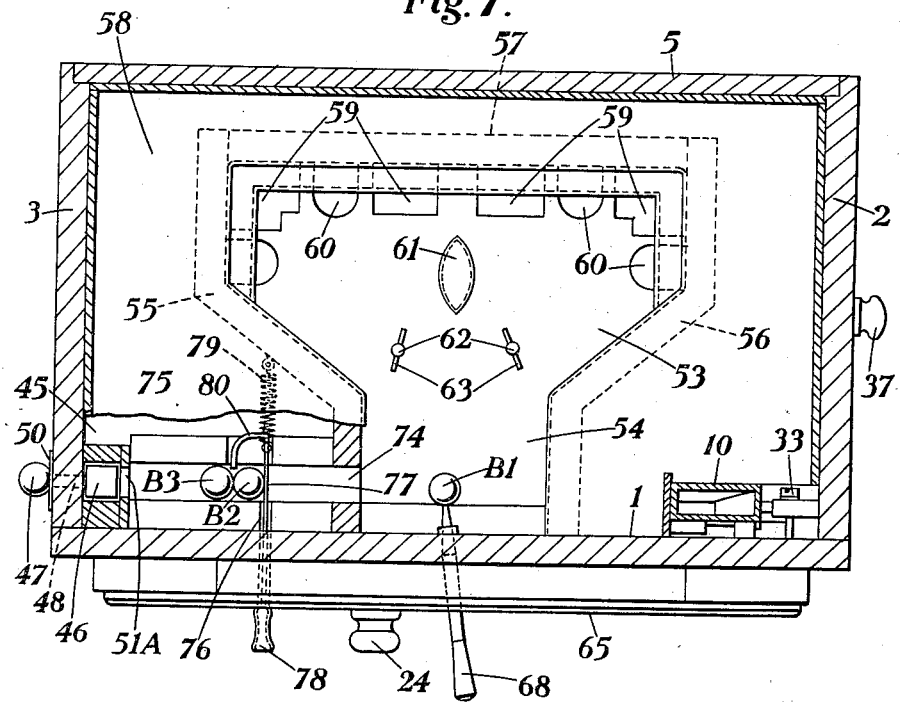
Figure 7 is a sectional plan view on line g, g, Figure 4.

To bring the balls B1, B2, B3, into play the knob 47 is grasped by the player with the left hand and moved upwardly of the vertical slot 49 carrying with it the block 46 until the balls are brought level with the lateral shutter-controlled aperture or slot 51A at the top of the well 45 through which slot the balls roll by gravity into the inclined channeled chute 75 and come to rest against the rear face of the sliding gate 77 (see Figure 3 and 7). With the left hand the player then seizes the forwardly projecting handle 78 of the gate 77 and draws the gate forwardly against its return spring 79, causing the curved finger 80 to hook the first ball B1 of the series and pass it through the arched slot 81 in the gate whence it rolls off the chute 75 through the aperture 74 in the wall 55 on to the baulk area 54.

The player then grasps the cue 68 with the right hand, and, by sighting through the glazed panel 8, addresses the ball B1 with the cue, in a manner similar to the game of billiards, and, by imparting axial movement to the cue 68 strikes the ball in the direction of one or other side of the cushion 61 to cause the ball to rebound therefrom into one of the target apertures 60, if possible; the multi-directional mounting of the cue 68 enabling the player to impart "side", "spin", or "drag" to the ball for the purpose of acquiring the proper angle of rebound from the cushion 61 to direct the ball into a desired target aperture, and the absence of a spring to urge the cue enabling the player to have better control over the cue and permitting more accurate and delicate striking of a ball than is possible when a spring-controlled cue is merely released to play a stroke.

If the player's judgment and execution are sufficiently accurate to cause the ball to be directed by the cushion 61 into one of the target apertures 60, the ball will drop therethrough on to the tray 84, whence it will roll by gravity via the passage 90 and shutter-controlled aperture 52 in the lower part of the well 45 back into the well, whence it may be elevated as before into the chute 75 for re-play. If, on the other hand, the ball, instead of passing through one of the target apertures 60, passes through one of the target apertures 59, it falls on to the tray 82 and rolls by gravity through the channel 85, whence it passes back into the pivotal trough 21 and is "dead" or out of play for the remainder of the session or innings, the duration of which depends upon the player's ability to strike the balls on to the cushion 61 with sufficient accuracy to have them returnable for re-play.

When all the balls have been lost through the target apertures 59, the game cannot be resumed except by the insertion of another coin into the cabinet.

As the transverse slot 64 in the front of the cabinet is masked by the sliding shutter 67 through which the cue 68 passes, it is not possible for a player to align the eye with a ball in the baulk area, so that a high degree of skill in addressing the ball through the glazed panel and at a point some distance above the playing surface is necessary.

The configuration of the playing surface as well as the number, disposition, and form of the target apertures and also of the cushion and intermediate obstacles are capable of variation without departing from the invention, and various purely constructional alterations to the embodiment illustrated may be made. For example, the playing surface may be downwardly inclined forwardly of the cabinet and the target apertures through which balls are lost or become "dead" may be located forwardly of the surface instead of adjacent those apertures through which the balls are returned for replay; this latter arrangement may be employed with a horizontal playing surface, the balls rebounding from the cushion or intermediate obstacles into either series of apertures after being struck by the cue as already described.

What I claim is:—

1. An amusement apparatus comprising, a vertical cabinet, a transparent panel in said cabinet, a playing surface located approximately horizontal within said cabinet so as to be visible through said transparent panel, said playing surface terminating remotely from said transparent panel in a series of target apertures, a series of balls for playing individually over said playing surface, a resilient deflector located on said playing surface intermediately of said transparent panel and said target apertures, ball feeding means to bring said series of balls to the level of said playing surface, a hand-operated device to deliver one of said balls at a time on to said playing surface, a horizontal slot in said cabinet below said transparent panel, a hand-propelled multi-directionally mounted striker accommodated slidably in said horizontal slot, an inclined tray located within said cabinet and communicating with some of said target apertures, said inclined tray also communicating with said ball feeding means whereby a ball can be returned to said playing surface for re-play, and a second inclined tray within said cabinet communicating with others of said target apertures and also communicating with said ball feeding means to divert a ball into the "dead" and out of play position.

2. An amusement apparatus comprising, a vertical cabinet, a transparent panel in said cabinet, a playing surface located approximately horizontal within said cabinet so as to be visible through said transparent panel, said playing surface terminating remotely from said transparent panel in a series of target apertures, a series of balls for playing individually over said playing surface, a resilient deflector located on said playing surface intermediately of said transparent panel and said target apertures, ball feeding means to bring said series of balls to the level of said playing surface, a hand-operated device to deliver one of said balls at a time on to said playing surface, a horizontal slot in said cabinet below said transparent panel, guides along said horizontal slot, a sleeve mounted loosely in said guides, said sleeve being capable of movement angularly in relation to said guides, a hand-propelled striker accommodated within said sleeve so as to be capable of limited axial movement therein freely in both directions, an inclined tray located within said cabinet and communicating with some of said target apertures, said inclined tray also communicating with said ball feeding means whereby a ball can be returned to said playing surface for re-play, and a second inclined tray within said cabinet communicating with others of said target apertures and also communicating with said ball feeding means to divert a ball into the "dead" and out of play position.

3. An amusement apparatus comprising a vertical cabinet, a transparent panel, a playing surface located nearly horizontally within said cabinet so as to be visible through said transparent panel, said playing surface terminating remotely from said transparent panel in a series of target apertures, a series of balls for playing individually over said playing surface, a resilient deflector located on said playing surface intermediately of said transparent panel and said target apertures, means for illuminating the interior of said cabinet, means whereby said illuminating means are controlled by said series of balls, ball feeding means to bring said series of balls to the level of said playing surface, a hand-operated device to deliver one of said balls at a time onto said playing surface, a horizontal slot in said cabinet below said transparent panel, a hand-propelled multi-directionally mounted striker accommodated slidably in said horizontal slot, an inclined tray located within said cabinet and communicating with some of said target apertures, said inclined tray also communicating with said ball feeding means whereby a ball can be returned to said playing surface for re-play, and a second inclined tray within said cabinet communicating with others of said target apertures and also communicating with said ball feeding means to divert a ball into the "dead" and out of play position.

FRANK JAMES RALPH.